(12) United States Patent
Shalem

(10) Patent No.: US 7,376,567 B2
(45) Date of Patent: May 20, 2008

(54) METHOD AND SYSTEM FOR EFFICIENTLY TRANSMITTING ENCODED COMMUNICATION SIGNALS

(75) Inventor: Ofer Shalem, Bat-Yam (IL)

(73) Assignee: Celtro Ltd, Petach Tikva (IS)

( * ) Notice: Subject to any disclaimer, the term of this patent is extended or adjusted under 35 U.S.C. 154(b) by 874 days.

(21) Appl. No.: 10/830,081

(22) Filed: Apr. 23, 2004

(65) Prior Publication Data

US 2005/0182623 A1  Aug. 18, 2005

(30) Foreign Application Priority Data

Feb. 16, 2004  (IL) .................................. 160410

(51) Int. Cl.
*G10L 19/00* (2006.01)
(52) U.S. Cl. ................................ 704/500
(58) Field of Classification Search ................. 704/500
See application file for complete search history.

(56) References Cited

U.S. PATENT DOCUMENTS

| | | | |
|---|---|---|---|
| 5,018,136 A | 5/1991 | Gollub | |
| 5,020,058 A | 5/1991 | Holden | |
| 5,299,198 A | 3/1994 | Kay et al. | |
| 5,546,395 A | 8/1996 | Sharma et al. | |
| 5,627,829 A | 5/1997 | Gleeson et al. | |
| 5,699,356 A | 12/1997 | Beever et al. | |
| 5,966,688 A * | 10/1999 | Nandkumar et al. | 704/222 |
| 6,061,346 A | 5/2000 | Nordman | |
| 6,115,394 A | 9/2000 | Balachandran et al. | |
| 6,301,479 B1 | 10/2001 | Roobol et al. | |
| 6,415,151 B1 | 7/2002 | Kreppel | |
| 6,452,915 B1 | 9/2002 | Jorgensen | |
| 6,480,717 B1 | 11/2002 | Ramaswamy | |
| 6,622,019 B1 | 9/2003 | Shalem et al. | |
| 6,957,172 B2 * | 10/2005 | Wegerich | 702/189 |

FOREIGN PATENT DOCUMENTS

WO  WO-98/51113  11/1998

* cited by examiner

*Primary Examiner*—Susan McFadden
(74) *Attorney, Agent, or Firm*—Browdy and Neimark

(57) ABSTRACT

A method for reducing a number of bits representing an encoded communication signal including classifying frames of an encoded signal according to at least one characterization criterion selected from among a plurality of predetermined characterization criteria, and selecting a representation signal for each of the frames, wherein the total number of bits comprised in the selected representation signals is less than the number of bits comprised in the encoded communication signal.

49 Claims, 4 Drawing Sheets

METHOD AND SYSTEM FOR EFFICIENTLY TRANSMITTING ENCODED COMMUNICATION SIGNALS

FIELD OF THE INVENTION

The present invention generally relates to communication networks, and more particularly to communication networks using compression means and enables better utilization of the bandwidth available.

BACKGROUND OF THE INVENTION

The rapid evolution of communication networks, among which wireless communication networks for mobile communications such as the Global System for Mobile communications (GSM) network, created a demand for increasing bandwidth utilization efficiency.

One way of increasing bandwidth utilization efficiency is described in U.S. Pat. No. 6,622,019, which describes a method of forwarding signals over a cellular link. The method described, includes receiving, at a first base station of a cellular fixed network, a packet of signals having a data payload directed to a second base station, determining whether the data payload will eventually be used at the second base station, and forwarding the packet payload if it will be used thereat and not forwarding the packet payload if it will not be used.

Since any increase in bandwidth utilization efficiency has substantial economic effects, additional improvements are considered as highly desired.

The disclosures of all references mentioned above and throughout the present specification are hereby incorporated herein by reference.

SUMMARY OF THE INVENTION

The present invention seeks to provide novel apparatus and improved methods that enable to increase bandwidth utilization efficiency in communication networks, and particularly in cellular based wireless telecommunication networks for mobile applications.

Further objects and features of the invention will become apparent from the following description and the accompanying drawings.

The present invention, in one of its preferred embodiments, enables reduction in the traffic to be transmitted, in particularly in traffic that has already been compressed.

By an embodiment of the invention, when an encoded signal which comprises a number of frame signals (or simply frames) is received, each frame is classified in accordance with one or more pre-defined characterization criterion. Such characterization criteria are for example the following: if the frame is identified to comprise a speech type signal, the frame could be characterized as either being voice signal frame or a noise signal frame. A voice signal frame may be further characterized as a stationary frame (where the voice signal is essentially at a constant level), as a transition frame between phonemes, and the like. A noise type of frame may be further characterized as a silence frame, a background noise and the like. Another type of frame is video type, which can be characterized as a frame with a rapid/slow change in respect of the preceding frame, a frame with a rapid/slow change in respect of pixels in that frame, and the like. Preferably, such a classification process may be carried out also at a sub-frame level frame, so that one frame may contain more than one classification, where each of the classifications is based on the characterization of the corresponding part of the frame.

There is thus provided in accordance with a preferred embodiment of the present invention, a method for reducing a number of bits representing an encoded signal, the method comprising:

receiving an encoded signal represented by a plurality of frames, where each of said frames comprises at least one frame signal;

classifying said at least one frame signal in accordance with at least one characterization criterion selected from among a plurality of predetermined characterization criteria;

selecting a corresponding representation signal for each of the at least one frame signal, wherein the number of bits comprised in a plurality of the selected corresponding representation signals, is less than the number of bits comprised in the received signal.

Alternatively, or in addition, the method described may be carried out at the sub-frame level. In such a case, the step of classifying comprises dividing a frame into a number of sub-frames, classifying each of the sub-frame signals associated with the at least one frame signal, and each of such sub-frame signals is classified in accordance with a suitable, at least one characterization criterion selected from among the predetermined characterization criteria, as discussed above. Thus, the step of selecting corresponding representation signals for some of the frame (or sub-frame) signals, comprises selecting a corresponding representation signal for the frame signal and/or selecting a corresponding representation signal for a sub-frame signal(s). Consequently, a frame signal may be represented by a selected corresponding representation signal, or by a number of selected a corresponding representation signals which correspond to the sub-frame signals, and when taken together, carry the information required for the regeneration of the entire frame signal.

According to an embodiment of the invention, a selected corresponding representation signal has less number of bits than the frame (or sub-frame) signal which it represents. However, as should be appreciated by those skilled in the art, this does not necessarily have to be the case, and the number of bits in the representation signal could be essentially equal to the number of bits in the frame (or sub-frame) signal, and in extreme cases even exceed that number, as long as the overall number of bits required to represent the plurality of frames of the encoded signal is less than that of the bits included in the signal received.

In accordance with another embodiment of the present invention, the selecting step of the corresponding representation signal comprises discarding the frame or sub-frame signal.

According to another embodiment of the present invention, the selecting step of the corresponding representation signal comprises using representation signal that is essentially identical to the corresponding frame (or sub-frame) signal.

By still another embodiment of the invention, each of said plurality of frames is received at an equal time interval.

In accordance with yet another embodiment of the present invention, the representation signal of the at least one frame signal (or the at least one sub-frame signal) further comprises at least one information bit. Preferably, that at least one information bit comprises regeneration information to enable regeneration of the at least one frame signal (or the at least one sub-frame signal, or even a plurality of sub-frame signals, as the case may be) out of its representation signal.

Consequently, a frame signal can be regenerated either through the use of a representation signal which corresponds to that frame signal, or through the use of regenerating the sub-frame signals which together comprise that frame signal.

In addition or in the alternative, the method provided in accordance with a preferred embodiment of the invention further comprises generating at least one outband message (i.e. a message that is not combined with the representation signals) and not necessarily transmitted along the same path as the representation signals. Preferably, this message comprises information to enable regeneration of the at least one frame signal (or the at least one sub-frame signal) out of its representation signal. Still preferably, one such message may comprise information to enable regeneration of a plurality of frame (or sub-frame) signals out of their representation signals.

By yet another preferred embodiment of the invention, one representation signal is used for representing a number of frame signals.

According to yet another preferred embodiment of the present invention, the step of representing comprises decoding at least one of the plurality of frame signals to obtain therefrom at least one decoded frame signal. Then classifying the at least one decoded frame signal as explained above, and selecting a corresponding representation signal for the at least one decoded frame signal. Preferably, after carrying out this procedure, the number of bits comprised in that selected corresponding representation signal is less than the number of bits comprised in the at least one frame signal in its encoded form. In addition or in the alternative, the decoding step comprises the decoding of at least one sub-frame signal (which is part of the frame signal) so as to obtain at least one decoded sub-frame signal. The at least one decoded sub-frame signal is then classified and a corresponding representation signal is selected for representing the decoded sub-frame signal, which in turn may be used sometimes to represent the whole frame to which that sub-frame belongs.

According to yet another preferred embodiment of the invention, the selecting of a corresponding representation signal comprises comparing at least one bit of at least one frame signal with a pre-defined code list, and selecting a code to represent that at least one frame signal. As could be appreciated by those skilled in the art, a similar method, mutatis mutandis, of selecting the appropriate representation signal may be carried out also for the sub-frame signals.

By yet another preferred embodiment of the invention, the selecting of a corresponding representation signal comprises applying a mathematical algorithm on at least one bit of at least one frame signal and retrieving thereby a code to represent that at least one frame signal.

Similarly to the above, such a selection may be carried out, mutatis mutandis, for sub-frame signals. Alternatively, the code retrieved for a sub-frame signal may represent a frame signal of which comprises that sub-frame signal.

By another embodiment of the present invention the method also comprises generating reconstruction bits for at least some of the selected corresponding representation signals so as to enable the regeneration of their corresponding frame (or sub-frame, as the case may be) signals.

Preferably, the reconstruction bits represent bits that are not included in the selected corresponding representation signals.

In accordance with still another preferred embodiment, the generating of the reconstruction bits is carried out so as to comply with spectral characteristics and energy characteristics of an original signal that was received in its encoded form.

By yet another preferred embodiment, the method provided further comprising generating at least part of the reconstruction bits from parameters generated by a compressing device operative to transmit the selected corresponding representation signals.

According to another embodiment, the method further comprises a step of transmitting the representation signals, preferably, in response to determining that a communication activity level along the relevant communication path exceeds a pre-defined activity threshold level.

Also, as described above, the encoded signal is a member selected from the group comprising of: an encoded speech signal; an encoded video signal; and a combination thereof.

In accordance with another preferred embodiment of the invention there is provided a transmission method for use in a communication network, which comprises the steps of:

receiving, at a first end of a communication path, a compressed signal provided at a first bit-rate, the compressed signal being represented by a plurality of frames generated by a codec, where each of said frames comprises at least one frame signal; and if a communication activity level along said communication path extending between said first end and a second end does not exceed a pre-defined activity threshold level, transmitting the compressed signal at the first bit-rate from the first end towards the second end, and if the communication activity level does exceed the pre-defined activity threshold level, then:

classifying the at least one frame signal in accordance with at least one characterization criterion selected from among a plurality of predetermined characterization criteria;

selecting a corresponding representation signal for each of said at least one frame signal, wherein the number of bits comprised in a plurality of the selected corresponding representation signals, is less than the number of bits comprised in the signal received; and transmitting the selected corresponding representation signals at a second bit-rate which is lower than the first bit-rate along the communication path, from the first end towards the receiving end.

Preferably, the codec referred to above is one that operates to produce bits in equal time intervals.

According to yet another embodiment, there is provided a method for transmitting an encoded speech signal in a communication network, the method comprising the steps of:

receiving, at a first end of a communication path, an encoded speech signal provided at a first bit-rate, the encoded speech signal being represented by a set of frames generated by a speech codec that operates to produce bits in equal time intervals; and if a voice activity level along said communication path extending between the first end and a second end of the communication path does not exceed a voice activity threshold level, transmitting the encoded speech signal at the first bit-rate from said first end towards said second end, and if the voice activity level exceeds the voice activity threshold level:

decompressing at least part of the encoded speech signal to obtain at least partially decoded speech signal thereof, re-encoding the at least partially decoded speech signal using an adaptive multi-rate coding algorithm to obtain a coded speech signal at a second bit-rate which is lower than the first bit-rate, and transmitting the re-encoded speech signal at the second bit-rate.

Preferably, the first bit-rate and/or the second bit-rate are selected from the following bit-rates: 12.2 kbit/s; 10.2 kbit/s; 7.95 kbit/s; 7.40 kbit/s; 6.70 kbit/s; 5.90 kbit/s; 5.15 kbit/s; and 4.75 kbit/s. however it should be noted that such a selection of bit-rate can be made according to this embodiment of the invention while ensuring that the second bit-rate is maintained lower than the first bit-rate.

According to another aspect of the present invention there is provided an apparatus adapted for reducing a number of communicated bits and comprising:

a receiver operative to receive an encoded signal, the encoded signal being represented by a plurality of frames, where each of said frames comprises at least one frame signal;

a processor operatively associated with the receiver and operative to classify each of the at least one frame signal in accordance with at least one characterization criterion selected from among a plurality of predetermined characterization criteria, and to select a corresponding representation signal for each of said at least one frame signal; and a transmitter operative to transmit the selected corresponding representations signals, representing the plurality of frames received, wherein a number of bits transmitted by the transmitter associated with the encoded signal received, is less than the number of bits of that encoded signal received by the receiver.

Preferably, the apparatus is adapted to operate in a cellular network as a base transceiver station (BTS) or a base station controller (BSC).

In accordance with a preferred embodiment of this aspect of the invention, the processor is also operative to generate, for at least some of the selected corresponding representations signals, regeneration bits which enable the regeneration, approximately or identically, of non-transmitted bits of at least some of the frame signals, while the transmitter is operative to transmit the regeneration bits together with transmitted bits of the selected corresponding representations signals.

Preferably, the processor is operative to generate the regeneration bits so as to comply with spectral characteristics and energy characteristics of an input signal from which the encoded signal was generated.

Still preferably, the processor is also operative to detect a communication activity level along a communication path extending between a first end (e.g. the transmitter) and a second end (e.g. a receiver), and wherein the transmitter is adapted to transmit the regeneration bits together with transmitted bits of the selected corresponding representations signals in response to a determination that the communication activity level exceeds a pre-defined activity threshold level.

According to yet another preferred embodiment, there is provided an apparatus for use at a transmitting end of a communication path, the apparatus comprising:

a receiver operative to receive a compressed signal provided at a first bit-rate, the compressed signal being represented by a plurality of frames generated by a codec, where each of said frames comprises at least one frame signal;

a processor operatively associated with the receiver and operative to perform the following:

determine whether a communication activity level in communication between along a transmission path exceeds a pre-defined activity threshold level, and if said communication activity level exceeds said pre-defined activity threshold level:

classify said at least one frame signal in accordance with at least one characterization criterion selected from among a plurality of predetermined characterization criteria, and select an appropriate corresponding representation signal by which represent each of the at least one frame signal; and a transmitter operative to transmit the compressed signal at the first bit-rate if the communication activity level does not exceed the activity threshold level, and, if the communication activity level exceeds said activity threshold level, to transmit the selected corresponding representation signals at a second bit-rate which is lower than the first bit-rate.

Preferably, the compressed signal comprises a compressed speech signal, the communication activity level comprises a voice activity level, and the pre-defined activity threshold level comprises a pre-defined voice activity threshold level. An example for such a pre-defined voice activity threshold level is a voice activity of about 35 to 45%, preferably about 40%.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

Figure 2:
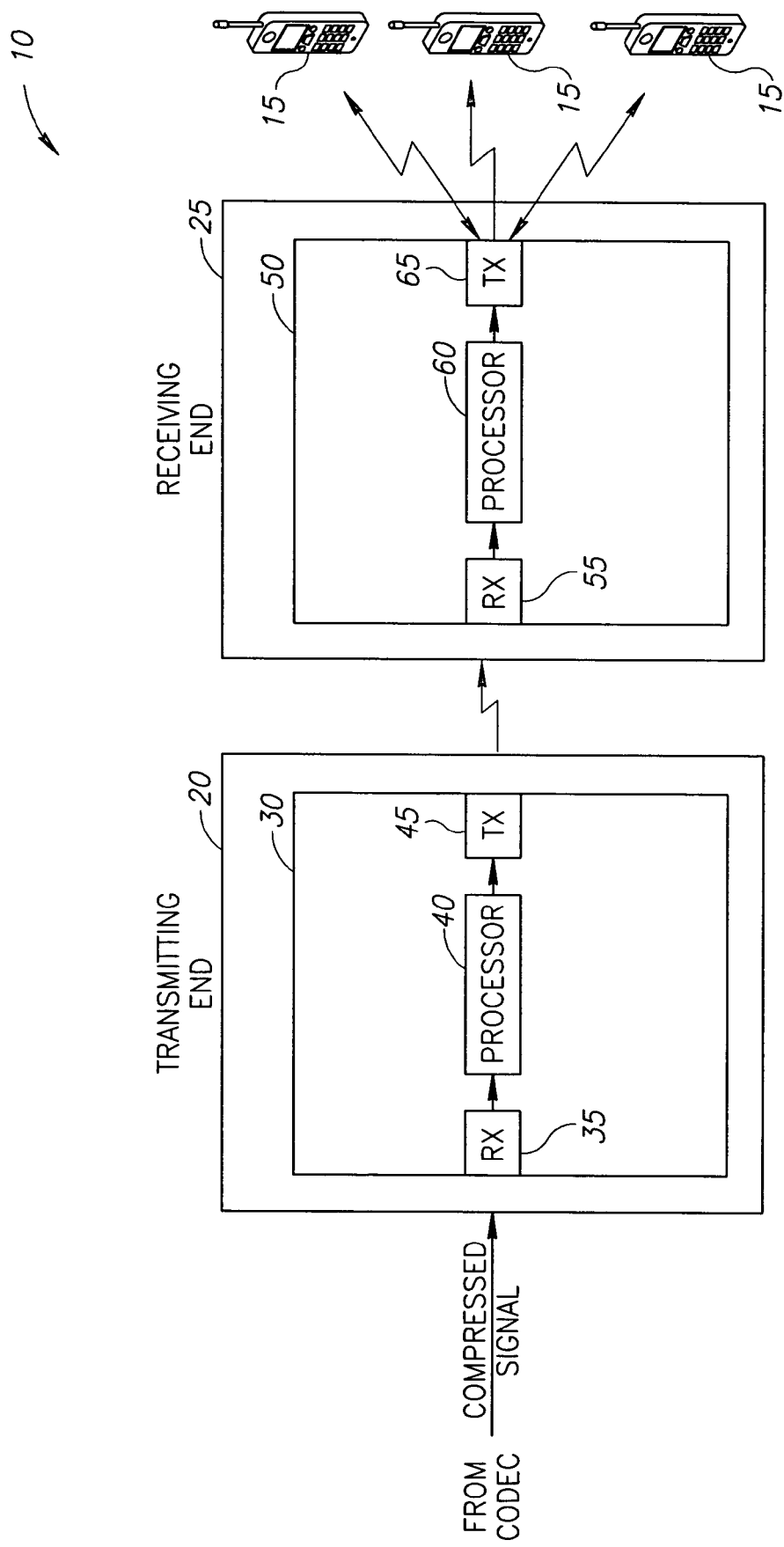
FIG. 2 is a simplified block diagram illustration of a preferred implementation of a portion of a communication network constructed and operative in accordance with another preferred embodiment of the present invention.

Reference is now made to FIG. 2 which is a simplified block diagram illustration of a preferred implementation of a portion of a communication network 10 constructed and operative in accordance with a preferred embodiment of the present invention. By way of example, and without limiting the generality of the foregoing, the network 10 is shown to include a wireless communication network such as a cellular based wireless telecommunication network for mobile applications. The cellular based wireless telecommunication network for mobile applications may preferably be a digital cellular telecommunication network, such as a Global System for Mobile communications (GSM) network.

The network 10 preferably uses cellular wireless communication to provide communication services to a plurality of mobile terminals (MTs) 15 via at least one base transceiver station (BTS) and at least one base station controller (BSC) .It is however appreciated that in many typical applications a plurality of BTSs and BSCs are used to provide the communication services to the MTs 15.

Each BSC preferably controls and schedules communication among a plurality of BTSs in the network 10. A BSC may also operate as a headend for transmitting data to MTs 15 in a cell service area associated with the BSC. Each BTS preferably communicates with a BSC, and may also preferably communicate with additional network elements, such as a server, via a BSC. Typically, BSCs and BTSs are located at separate locations.

Each BTS may be referred to as a transmitting end when transmitting information to any BSC and as a receiving end when receiving information from any BSC. Similarly, each BSC may be referred to as a transmitting end when transmitting information to any BTS and as a receiving end when receiving information from any BTS. By way of example and without limiting the generality of the foregoing, communication between a single transmitting end 20 and a single receiving end 25 is depicted in FIG. 2 The transmitting end 20 may include one of the following: a BTS; and a BSC. If the transmitting end 20 includes a BTS, the receiving end 25 preferably includes a BSC. Conversely, if the transmitting end 20 includes a BCS, the receiving end 25 preferably includes a BTS. By way of example, in the embodiment depicted in FIG. 2 the transmitting end 20 includes a BCS and the receiving end 25 includes a BTS.

It is appreciated that other transmitting ends (not shown) and receiving ends (not shown) in the network 10 may have structure and functionality similar to the structure and functionality of the transmitting end 20 and the receiving end 25 that are described hereinafter.

The network 10 exemplified herein supports, inter alia, transmission of compressed signals, so that a compressed (encoded) signal is transmitted between the transmitting end 20 and the receiving end 25. The compressed signal is represented by a plurality of frames generated by an encoder-decoder (codec) (not shown) that operates in this example to produce bits in equal time intervals. The codec may be, for example, a codec in another transmitting end (not shown) in the network 10 that provides the compressed signal to the transmitting end 20.

The term "frame" is used throughout the specification and claims to include a packet of information or a block of information including envelope information, such as a packet header or a block header respectively.

The compressed signal preferably includes one of the following: a compressed speech signal; a compressed video signal; and any combination thereof.

The term "speech signal" is used throughout the specification and claims to refer to a complex speech signal that may include speech, noise, silence and transitions among speech, noise and silence.

The term "video signal" is used throughout the specification and claims to refer to a composite video signal that may include one of, or a combination of the following: video; audio; and data.

In a case where the compressed signal is a compressed speech signal, the codec is preferably a speech codec. In accordance with a preferred embodiment of the present invention the transmitting end 20 includes apparatus 30 for reducing a number of communicated bits in communication of the compressed signal. The apparatus 30 preferably includes a receiver (Rx) 35, a processor 40, and a transmitter (Tx) 45.

Receiver 35 receives the compressed signal which, as mentioned above, is represented by a plurality of frames. Processor 40 which is operatively associated with receiver 35, is operative to classify each frame in accordance with a characterization criterion selected from among a plurality of possible criteria, and to represent each of these frames, or parts of these frames (sub-frames), by a selected corresponding representation signal which is selected based on the above mentioned classification.

Transmitter 45 operates to transmit to the receiving end 25 the selected corresponding representation signals, which are selected so as to ensure that the total number of bits included in the various representation signals which are associated with the compressed signal, is less than the total number of bits included in that encoded signal that was received at receiver 35.

Processor 40 may also preferably generate, for at least some of the frames in the subset, regeneration bits which are usable to regenerate, approximately or identically, non-transmitted bits of the at least some of the frames in the subset. In such a case the transmitter 45 also preferably transmits the regeneration bits together with transmitted bits of the frames in the subset.

It is appreciated that the additional transmission of the regeneration bits preferably still results in a reduction in the number of communicated bits in communication of the compressed signal. Any reduction in the number of communicated bits in communication of the compressed signal results in an increase in bandwidth utilization efficiency.

Receiving end 25 includes apparatus 50 which operates inversely to the operation of apparatus 30 and is adapted to regenerate the compressed signal from signals received from transmitting end 20. Specifically, apparatus 50 in this example includes a receiver 55, a processor 60, and a transmitter 65.

Receiver 55 receives the signals transmitted from transmitting end 20. If the signals received are substantially identical to the compressed signal, processor 60 passes the compressed signal, substantially without alteration, to transmitter 65, which communicates the compressed signal, for example to one of the MTs 15.

However, if the signals received from transmitter 45 substantially include the representation signals and/or the regeneration bits, processor 60 will regenerate, approximately or identically, the non-transmitted bits of the compressed signal and through that, the entire compressed signal. Processor 60 shall then provide the compressed signal to transmitter 65, and the latter shall communicate the compressed signal to one or more of the MTs 15.

It is appreciated that processor 60 may determine whether the signals received at the receiver 55 are signals that should be forwarded to transmitter 54, or should be operated on (e.g. if they are a combination of regeneration bits and representation bits). Such determination is made, for example, by analyzing a field in a header (not shown) of at least one received packet (not shown). Processor 40 assigns such a field with different values to indicate whether the signal is the compressed signal or whether the packet includes representation bits (with or without regeneration bits).

In operation, the transmitting end 20 may, for example, receive the compressed signal from the codec at a first bit-rate. The processor 40 may preferably determine whether a communication activity level in communication between the transmitting end 20 and the receiving end 25 exceeds a pre-defined activity threshold level. Then, if the communication activity level does not exceed the activity threshold level, processor 40 may instruct transmitter 45 to transmit towards receiving end 25 the compressed signal at the first bit-rate substantially without alteration.

However, if the communication activity level exceeds such a pre-defined activity threshold level, processor 40 shall start the process of classifying each frame (or even sub-frame(s)) of the encoded signal so as to allow the reduction of bits to be transferred. By reducing the number bits to be transferred, processor 40 enables transmitter 45 to transmit towards the receiving end 25 the modified compressed signal (the representation signal of the compressed signal) at a second bit-rate which is lower than the first bit-rate by transmitting to the receiving end 25 the representation signals. Transmission of the compressed signal at the second bit-rate results in an increase in bandwidth utilization efficiency.

At the receiving end 25, apparatus 50 that receives the compressed signal at the second bit-rate ultimately reconverts, approximately or identically, the modified compressed signal into the compressed speech signal at the first bit-rate.

It is appreciated that in the case where the compressed signal includes a compressed speech signal, the communication activity level preferably includes a voice activity level, and the activity threshold level preferably includes a voice activity threshold level. The voice activity threshold level may be, for example, a voice activity of about 40.

The signal ultimately transmitted from the transmitting end 20 to the receiving end 25 is therefore a reduced bit-rate compressed signal having a reduced number of communicated bits which is generated from the compressed signal.

Figure 1:
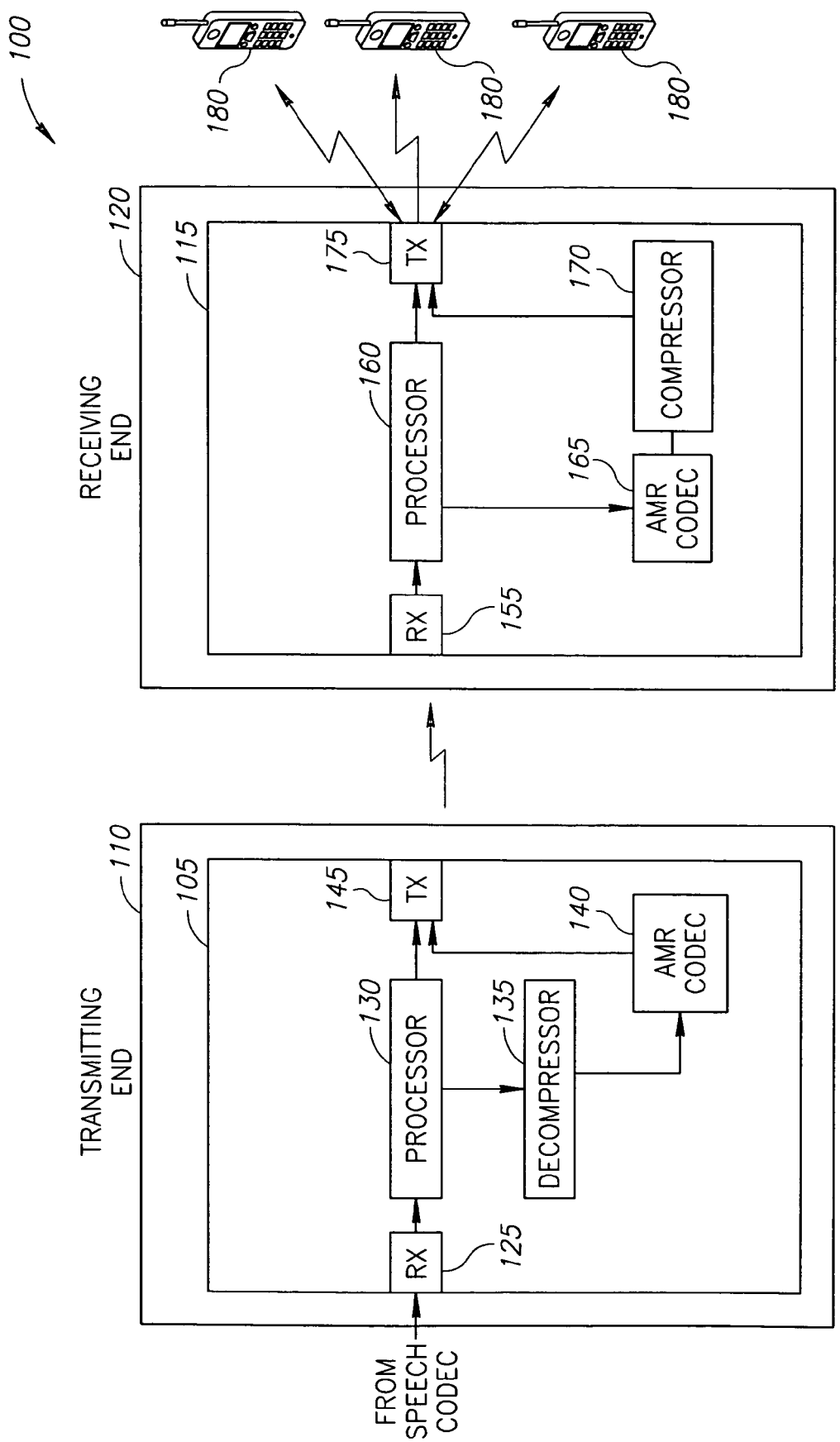
FIG. 1 is a simplified block diagram illustration of a preferred implementation of a portion of a communication network constructed and operative in accordance with a preferred embodiment of the present invention.

Reference is now made to FIG. 1 which is a simplified block diagram illustration of a preferred implementation of a portion of a communication network 100 constructed and operative in accordance with another preferred embodiment of the present invention.

Preferably, the network 100 of FIG. 1 and the network 10 of FIG. 2 provide similar services and have similar characteristics except for the following: the network 100 is specifically adapted to support speech transmission; and bit-rate reduction in communication of a compressed speech signal or a reduction of a number of communicated bits in communication of the compressed speech signal is attained by means other than the means used in the network 10.

Specifically, transmission apparatus 105 at the transmitting end 110 of network 100 is analogous to apparatus 30 at transmitting end 20 of network 10, whereas receiving apparatus 115 in the respective receiving end 120 is analogous to apparatus 50 of receiving end 25 in network 10. However, the structure and functionality of transmission apparatus 105 and receiving apparatus 115 are different from the structure and functionality of apparatus 30 and apparatus 50 as described hereinafter.

Referring now to transmission apparatus 105, it comprises a receiver 125, a processor 130, a decompressor 135, an adaptive multi-rate codec 140, and a transmitter 145. The AMR codec 140 is preferably a codec based on the existing European standard ETSI EN 301 704 as is well known in the art.

Receiver 125 is operative in this example to receive a compressed speech signal provided to transmitting end 110 at a first bit-rate. The compressed speech signal is represented by a set of frames generated by a speech codec (not shown) that operates to produce bits in equal time intervals. The compressed speech signal preferably results from an input speech signal.

Processor 130 is operatively associated with receiver 125 and is operative to determine whether a voice activity level in communication between transmitting end 110 and receiving end 120 exceeds a voice activity threshold level.

If the voice activity level does not exceed the voice activity threshold level, processor 130 preferably instructs the transmitter 145 to transmit the compressed speech signal at the first bit-rate from transmitting end 110 to receiving end 120.

If the voice activity level does exceed the voice activity threshold level, then decompressor 135 decompresses part of all of the compressed speech signal received, to obtain at least partially decompressed speech signal. The decompressor 135 then provides the decompressed speech signal to AMR codec 140 which encodes the decompressed speech signal using an AMR coding algorithm to obtain a coded speech signal at a second bit-rate which is lower than the first bit-rate. The coded speech signal is then provided to transmitter 145 which transmits the ew-encoded speech signal at the second bit-rate from transmitting end 110 towards receiving end 120.

Referring now to receiving apparatus 115 at receiving end 120, the receiving apparatus 115 preferably operates inversely to the operation of transmission apparatus 105, regenerating the compressed speech signal at the first bit-rate from the signals transmitted at the second bit-rate from transmission apparatus 105. Specifically, receiving apparatus 115 preferably includes a receiver 155, a processor 160, an AMR codec 165, a compressor 170, and a transmitter 175.

Receiver 155 receives the signals transmitted from transmission apparatus 105. If the signals substantially include the compressed speech signal at the first bit-rate, then processor 160 passes the compressed speech signal at the first bit-rate substantially without alteration, to transmitter 175. Transmitter 175 will then communicate the compressed speech signal at the first bit-rate, for example to one of a plurality of MTs 180.

If the signals received substantially include the re-encoded speech signal at the second bit-rate, processor 160 provides the coded speech signal at the second bit-rate to the AMR codec 165. The AMR codec 165, that may preferably be similar in structure and functionality to the AMR codec 140, decodes the coded speech signal using an AMR decoding algorithm to obtain the decompressed speech signal. The decompressed speech signal is then provided to the compressor 170 that compresses the decompressed speech signal to obtain the compressed speech signal at the first bit-rate. The compressed speech signal at the first bit-rate is then provided to transmitter 175 that is preferably operative to communicate the compressed speech signal at the first bit-rate to the one of the plurality of MTs 180.

It is appreciated that the processor 160 may determine whether the information signals received at the receiver 155 are the coded speech signal or the compressed speech signal, for example, by analyzing a field in a header (not shown) of at least one received information packet (not shown). The processor 130 may assign this field different values for the coded speech signal and for the compressed speech signal, and the processor 160 may then detect a corresponding value in the field.

In operation, the transmitting end 110 may, for example, receive the compressed speech signal from the speech codec at the first bit-rate. The processor 130 may preferably determine whether the voice activity level in communication between the transmitting end 110 and the receiving end 120 exceeds the voice activity threshold level. Then, if the voice activity level does not exceed the voice activity threshold level, the processor 130 may preferably instruct the transmitter 145 to transmit to the receiving end 120 the compressed signal at the first bit-rate substantially without alteration.

However, if the voice activity level exceeds the voice activity threshold level, the processor 130 preferably initiates a process in which the compressed speech signal at the first bit-rate is ultimately converted to a coded speech signal at a second bit-rate that is lower than the first bit-rate. The coded speech signal at the second bit-rate is then transmitted by the transmitter 145 to the receiving end 120. At the receiving end 120, the receiving apparatus 115 that receives the coded speech signal at the second bit-rate ultimately reconverts, approximately or identically, the coded speech signal into the compressed speech signal at the first bit-rate. It is appreciated that transmission of the re-encoded speech signal at a second bit-rate that is lower than the first bit-rate results in an increase in bandwidth utilization efficiency.

Figure 3:
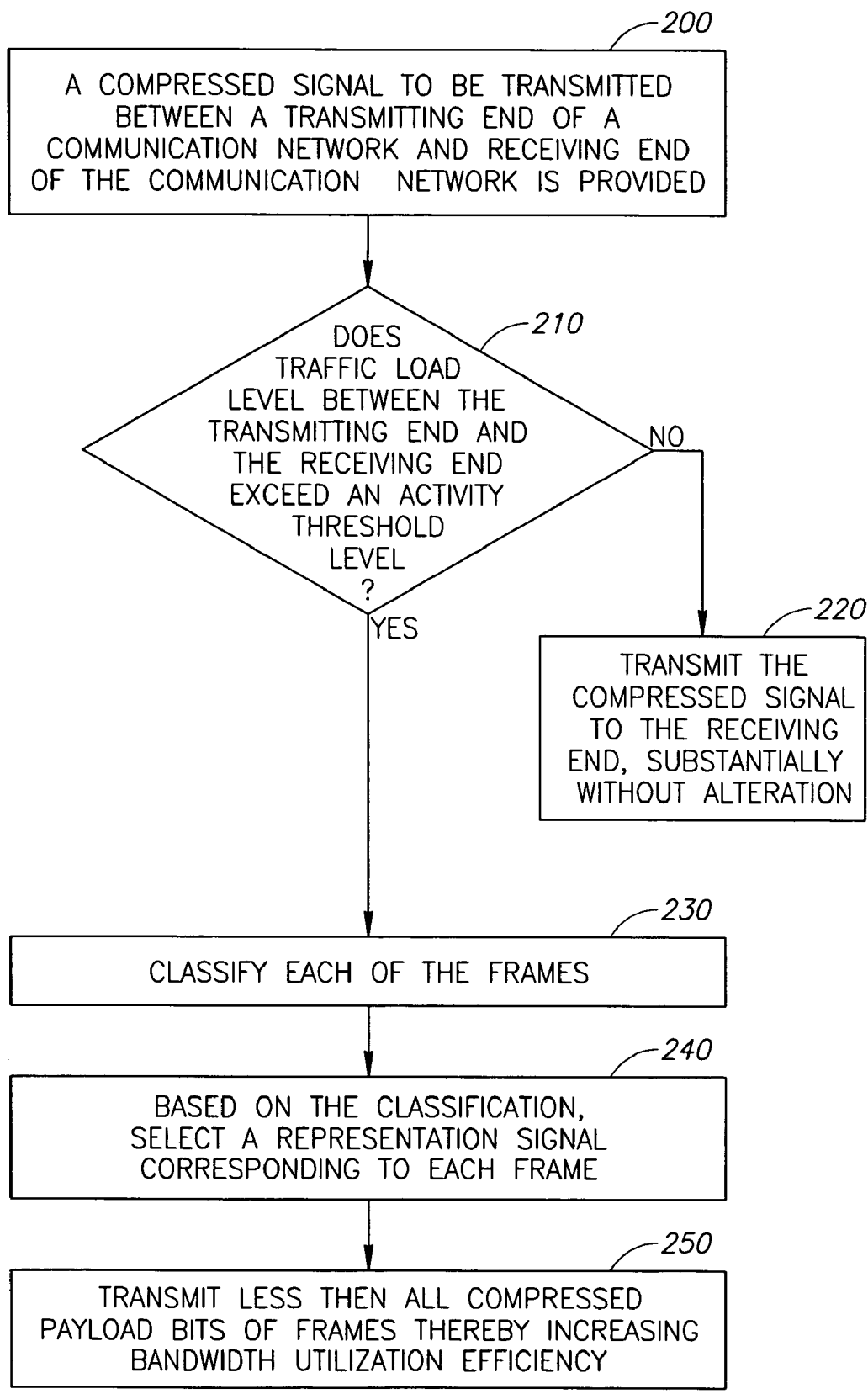
FIG. 3 is a simplified flowchart illustration of a preferred method of operation of the portion of the network of FIG. 1.

Reference is now made to FIG. 3 which is a simplified flowchart illustration of a preferred method of operating the portion of network 10 illustrated in FIG. 2.

A compressed signal to be transmitted between a transmitting end of a communication network and a receiving end of the communication network is provided (step 200). The compressed signal is represented by a number of frames. In this example the compressed signal comprises a compressed speech signal.

The communication activity level along the path extending between the transmitting end and the receiving end is determined (step 210). If the communication activity level does not exceed a pre-defined activity threshold level, the compressed signal is transmitted to the receiving end, substantially without alteration (step 220).

If the communication activity level exceeds the activity threshold level, each frame in the set of frames is classified (step 230) and based on that classification, a corresponding representation signal is selected (step 240). Then, the representation signals are transmitted (step 250) thereby reducing the number of communicated bits in communication of the compressed signal, which results in an increase in bandwidth utilization efficiency.

As previously explained, the communicated bits of the representation signals may include regeneration bits, where the regeneration bits are selected to enable the regeneration, approximately or identically, of non-transmitted bits. The regeneration bits may be generated to comply with spectral characteristics and energy characteristics of an input signal from which the compressed signal was generated and/or from parameters generated by the codec.

Figure 4:
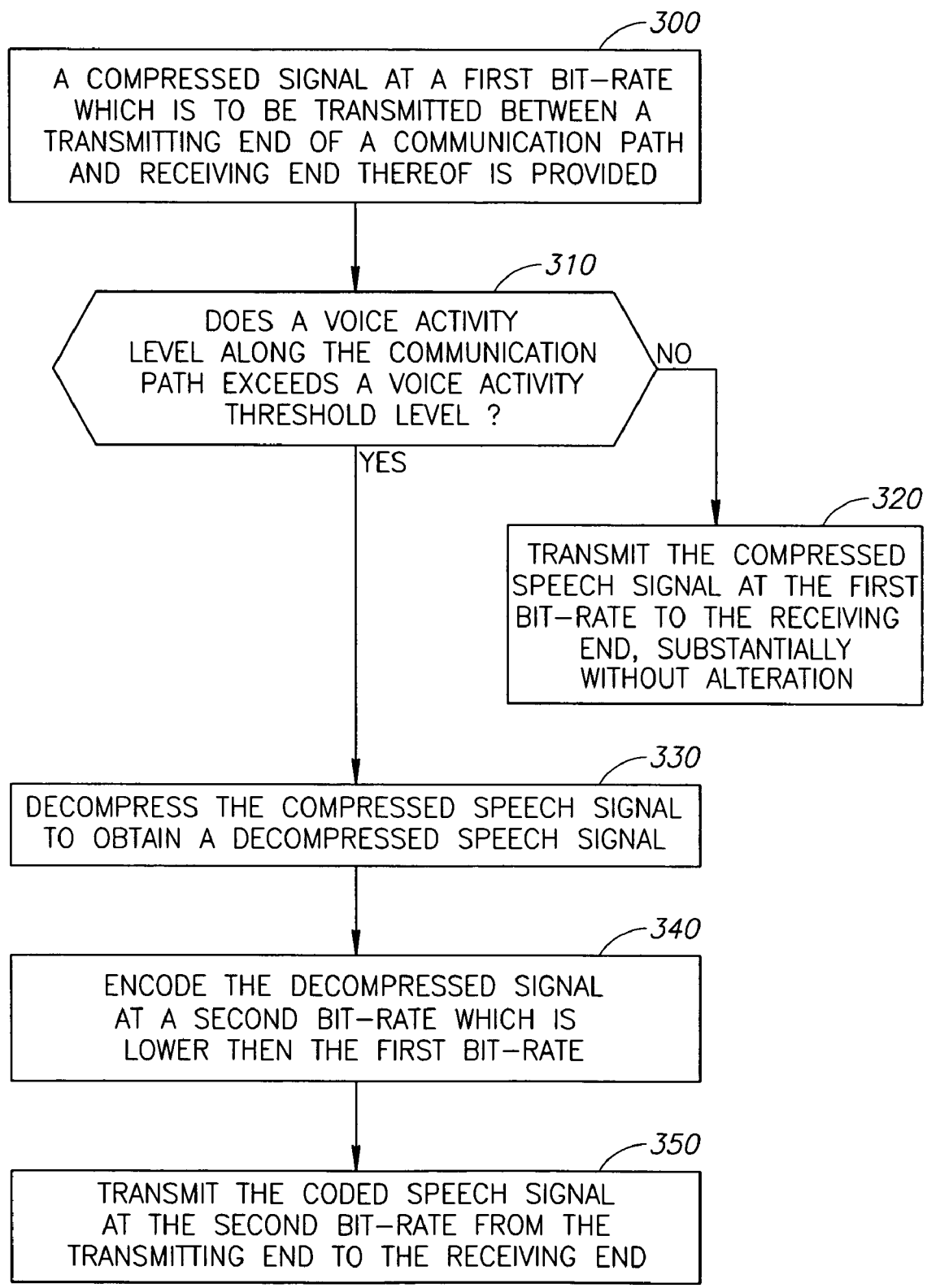
FIG. 4 is a simplified flowchart illustration of a preferred method of operation of the portion of the network of FIG. 2.

Reference is now made to FIG. 4 which is a simplified flowchart illustration of a preferred method of operation of the portion of the network 100 of FIG. 1.

A compressed speech signal is provided for transmission at a first bit-rate from a transmitting end of a communication path towards a receiving end of that path (step 300). Again, the compressed speech signal is represented by a set of frames.

A voice activity level along the communication path is then determined (step 310). If the voice activity level does not exceed a pre-defined voice activity threshold level, the compressed speech signal is transmitted at the first bit-rate to the receiving end, substantially without alteration (step 320).

If the voice activity level exceeds the pre-defined voice activity threshold level, the compressed speech signal is at least partially decompressed (step 330) to obtain a decompressed speech signal. The decompressed speech signal is re-encoded (step 340) to obtain a coded speech signal at a second bit-rate which is lower than the first bit-rate. The re-encoded speech signal is transmitted at the second bit-rate (step 350) from the transmitting end towards the receiving end.

It is appreciated that various features of the invention that are, for clarity, described in the contexts of separate embodiments may also be provided in combination in a single embodiment. Conversely, various features of the invention which are, for brevity, described in the context of a single embodiment may also be provided separately or in any suitable sub-combination.

It will be appreciated by persons skilled in the art that the present invention is not limited by what has been particularly shown and described herein above. Rather the scope of the invention is defined by the claims that follow.

What is claimed is:

1. A method for reducing a number of bits representing an encoded communication signal to be transmitted from a transmitting station toward a receiving station, the method comprising:

receiving, at the transmitting station an encoded communication signal represented by a plurality of frames, where each of said frames comprises at least one frame of encoded speech signal which was encoded by a speech codec;

classifying said at least one frame signal in accordance with at least one characterization criterion selected from a group consisting of voice and noise;

selecting a corresponding representation signal for each of said at least one frame signal, wherein the total number of bits comprised in a plurality of the selected corresponding representation signals, is less than the number of bits comprised in said encoded communication signal; and transmitting the corresponding representation signal for each of said at least one frame signal toward the receiving station.

2. A method according to claim 1, wherein the step of classifying said at least one frame signal comprises classifying a number of sub-frame signals associated with said at least one frame signal, and wherein each of said sub-frame signals is classified in accordance with an appropriate at least one characterization criterion selected from among said group consisting of voice and noise of predetermined characterization criteria.

3. The method according to claim 2, wherein the corresponding representation signal of said at least one frame signal comprises a plurality of corresponding representation signals, each representing a sub-frame signal.

4. The method according to claim 3, wherein said corresponding representation signals further comprise a plurality of information bits associated with said plurality of corresponding representation signals.

5. The method according to claim 4, wherein said plurality of information bits comprise regeneration information to enable regeneration of said sub-frames out of their corresponding representation signals.

6. A method according to claim 2, wherein the step of selecting a corresponding representation signal comprises comparing at least one bit of at least one sub-frame with a pre-defined code list, and selecting a code to represent said at least one sub-frame signal.

7. A method according to claim 2, wherein the step of selecting a corresponding representation signal comprises applying a mathematical algorithm on at least one bit of at least one sub-frame and retrieving thereby a code to represent said at least one sub-frame signal.

8. The method according to claim 7, wherein the code retrieved represents an entire frame signal of which said at least one sub-frame signal is part of.

9. The method according to claim 2 and also comprising: generating reconstruction bits for at least some of the selected corresponding representation signals thereof so as to enable regeneration of their corresponding sub-frame signals.

10. The method according to claim 2, wherein a sub-frame signal is classified as being voice signal sub-frame, or as a noise signal sub-frame.

11. The method according to claim 10, wherein said frame signal or sub-frame signal classified as being a voice signal is further characterized as being a stationary frame or sub-frame signal respectively, or a transition frame or sub-frame signal respectively, that comprises a change in phonemes.

12. The method according to claim 10, wherein said frame signal or sub-frame signal classified as being a noise signal is further characterized as being a silence frame or sub-frame signal respectively, or a background noise frame or sub-frame signal respectively.

13. The method according to claim 1, wherein the step of selecting corresponding representation signals for some of said frame or sub-frame signals, comprises discarding said frame or sub-frame signals, respectively.

14. The method according to claim 1, wherein the step of selecting corresponding representation signals for some of said frame or sub-frame signals, comprises selecting corresponding representation signals that are essentially identical to said frame or sub-frame signals, respectively.

15. A method according to claim 1, wherein a single corresponding representation signal is selected for representing a number of frame signals.

16. A method according to claim 1, wherein the step of selecting comprises decoding at least one of said plurality of frames to obtain at least one decoded frame, classifying said at least one decoded frame and selecting a corresponding representation signal to representing said decoded frame.

17. A method according to claim 16, wherein the number of bits comprised in said selected corresponding representation signal is less than the number of bits comprised in said at least one of said plurality of frames in its encoded form.

18. A method according to claim 16, wherein decoding of said at least one of said plurality of frames comprises decoding at least one sub-frame comprised in said at least one of frame and obtain at least one decoded sub-frame, classifying said at least one decoded sub-frame and selected a corresponding representation signal for representing said decoded sub-frame.

19. A method according claim 1, wherein the step of selecting a corresponding representation signal comprises comparing at least one bit of at least one frame signal out of said plurality of frame signals with a pre-defined code list, and selecting a code to represent said at least one frame signal.

20. The method according to claim 1, wherein each of said plurality of frames is received at an equal time interval.

21. A method according claim 1, wherein the step of selecting a corresponding representation signal comprises applying a mathematical algorithm to at least one bit of the at least one frame signal and retrieving thereby a code for representing said at least one frame signal.

22. The method according to claim 1, wherein the encoded communication signal comprises an encoded video signal.

23. The method according to claim 22, wherein a frame signal or a sub-frame signal of said encoded video signal is further characterized as a frame or sub-frame, respectively, as a frame or sub-frame with a rapid/slow change in respect of the respective preceding frame or sub-frame, or as a frame or sub-frame with a rapid/slow change in respect of pixels in that frame or sub-frame, respectively.

24. The method according to claim 1 and also comprising: generating reconstruction bits for at least some of the selected corresponding representation signals so as to enable the regeneration of the corresponding frame signals.

25. The method according to claim 24, wherein said reconstruction bits represent bits that are not included in said selected corresponding representation signals.

26. The method according to claim 24, further comprising generating at least part of the reconstruction bits from parameters generated by a compressing device operative to transmit said selected corresponding representation signals.

27. The method according to claim 24, wherein said generating step comprises generating reconstruction bits which comply with spectral characteristics and energy characteristics of the signal received in its encoded form.

28. The method according to claim 1, further comprising a step of transmitting said selected corresponding representation signals along a communication path extending between a transmitting end and a receiving end.

29. The method according to claim 28, wherein said step of transmitting is carried out in response to determining that a communication activity level along said communication path exceeds a pre-defined activity threshold level.

30. The method according to claim 1, wherein the corresponding representation signal of said at least one frame signal further comprises at least one information bit.

31. The method according to claim 30, wherein said at least one information bit comprises regeneration information to enable regeneration of said at least one frame signal out of its corresponding representation signal.

32. The method according to claim 30, wherein said at least one information bit comprises regeneration information to enable regeneration of a plurality of sub-frames out of their corresponding representation signals.

33. The method according to claim 1, further comprising generating at least one message where said message is not comprised within said corresponding representation signals and comprises information to enable regeneration of said at least one frame signal out of its corresponding representation signal.

34. The method according to claim 33, wherein said at least one message comprises information to enable regeneration of a plurality of frame signals out of their corresponding representation signals.

35. The method according to claim 33, wherein said at least one message comprises information to enable regeneration of a plurality of sub-frame signals out of their corresponding representation signals.

36. The method according to claim 1, wherein the encoded communication signal comprises a combination of an encoded speech signal and an encoded video signal.

37. An apparatus for reducing a number of communicated bits to be transmitted from a transmitting station toward a receiving station and comprising:
    a receiver that receives an encoded communication signal, the encoded communication signal being represented by a plurality of frames, where each of said frames comprises at least one frame signal;

a processor that is associated with the receiver and classifies each of said at least one frame signal in accordance with at least one characterization criterion selected from among a plurality of predetermined characterization criteria, and selects a corresponding representation signal representing each of said at least one frame signal; and a transmitter that transmit the selected corresponding representations signals received from said processor toward the receiving station, wherein the number of bits transmitted of the selected corresponding representation signals is less than the number of bits of the encoded communication signal received, wherein said processor generates, for at least some of the selected corresponding representations signals, regeneration bits which enable regenerating, approximately or identically, of non-transmitted bits of said at least some of the frame signals, and said transmitter transmits said regeneration bits together with transmitted bits of the selected corresponding representations signals.

38. A method for reducing a number of bits representing an encoded communication signal to be transmitted from a transmitting station toward a receiving station, the method comprising:

receiving, at the transmitting station an encoded communication signal represented by a plurality of frames, where each of said frames comprises at least one frame signal;

classifying said at least one frame signal in accordance with at least one characterization criterion selected from among a plurality of predetermined characterization criteria, the step of classifying said at least one frame signal comprises classifying a number of sub-frame signals associated with said at least one frame signal, and wherein each of said sub-frame signals is classified in accordance with an appropriate at least one characterization criterion selected from among said plurality of predetermined characterization criteria;

selecting a corresponding representation signal for each of said at least one frame signal, wherein the total number of bits comprised in a plurality of the selected corresponding representation signals, is less than the number of bits comprised in said encoded communication signal; and transmitting the corresponding representation signal for each of said at least one frame signal toward the receiving station.

39. The method according to claim 38, wherein said encoded communication signal comprises an encoded speech signal.

40. An apparatus for reducing a number of communicated bits to be transmitted from a transmitting station toward a receiving station and comprising:

a receiver that receives an encoded communication signal from a speech codec, the encoded communication signal being represented by a plurality of frames, where each of said frames comprises at least one frame signal;

a processor that is associated with receiver and classifies each of said at least one frame signal in accordance with at least one characterization criterion selected from a group consisting of voice and noise, and select a corresponding representation signal representing each of said at least one frame signal; and a transmitter that transmit the selected corresponding representations signals received from said processor toward the receiving station, wherein the number of bits transmitted of the selected corresponding representation signals is less than the number of bits of the encoded communication signal received.

41. The apparatus according to claim 40 operates in a cellular communication network.

42. The apparatus according to claim 40 and wherein the encoded communication signal comprises a combination of a compressed speech signal and a compressed video signal.

43. The apparatus according to claim 41 and wherein said cellular communication network comprises a Global System for Mobile communications (GSM) network.

44. The apparatus according to claim 40 operates in association with one of the following: a base transceiver station (BTS); and a base station controller (BSC).

45. The apparatus according to claim 40 and wherein said processor generates, for at least some of the selected corresponding representations signals, regeneration bits which enable regenerating, approximately or identically, of non-transmitted bits of said at least some of the frame signals, and said transmitter transmits said regeneration bits together with transmitted bits of the selected corresponding representations signals.

46. The apparatus according to claim 45 and wherein said processor generates the regeneration bits so as to comply with spectral characteristics and energy characteristics of an input signal from which said encoded communication signal was generated.

47. The apparatus according to claim 45, and wherein the processor detects a communication activity level along a communication path extending between a first end and a second end, and wherein said transmitter transmits said regeneration bits together with transmitted bits of the selected corresponding representations signals in response to a determination that the communication activity level exceeds a pre-defined activity threshold level.

48. The apparatus according to claim 40, and wherein the encoded communication signal comprises a compressed speech signal.

49. The apparatus according to claim 40, and wherein the encoded communication signal comprises a compressed video signal.

* * * * *